UNITED STATES PATENT OFFICE.

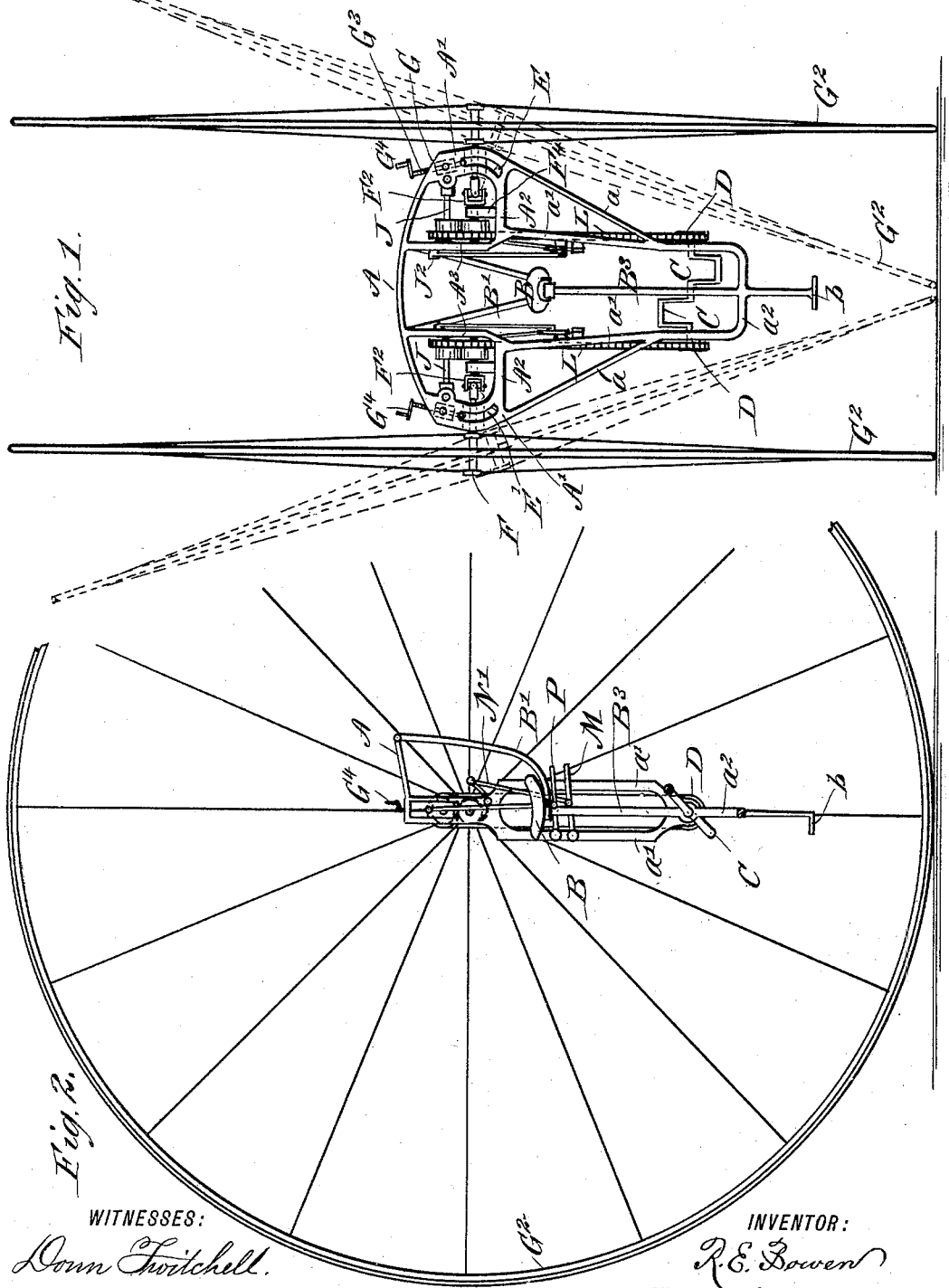

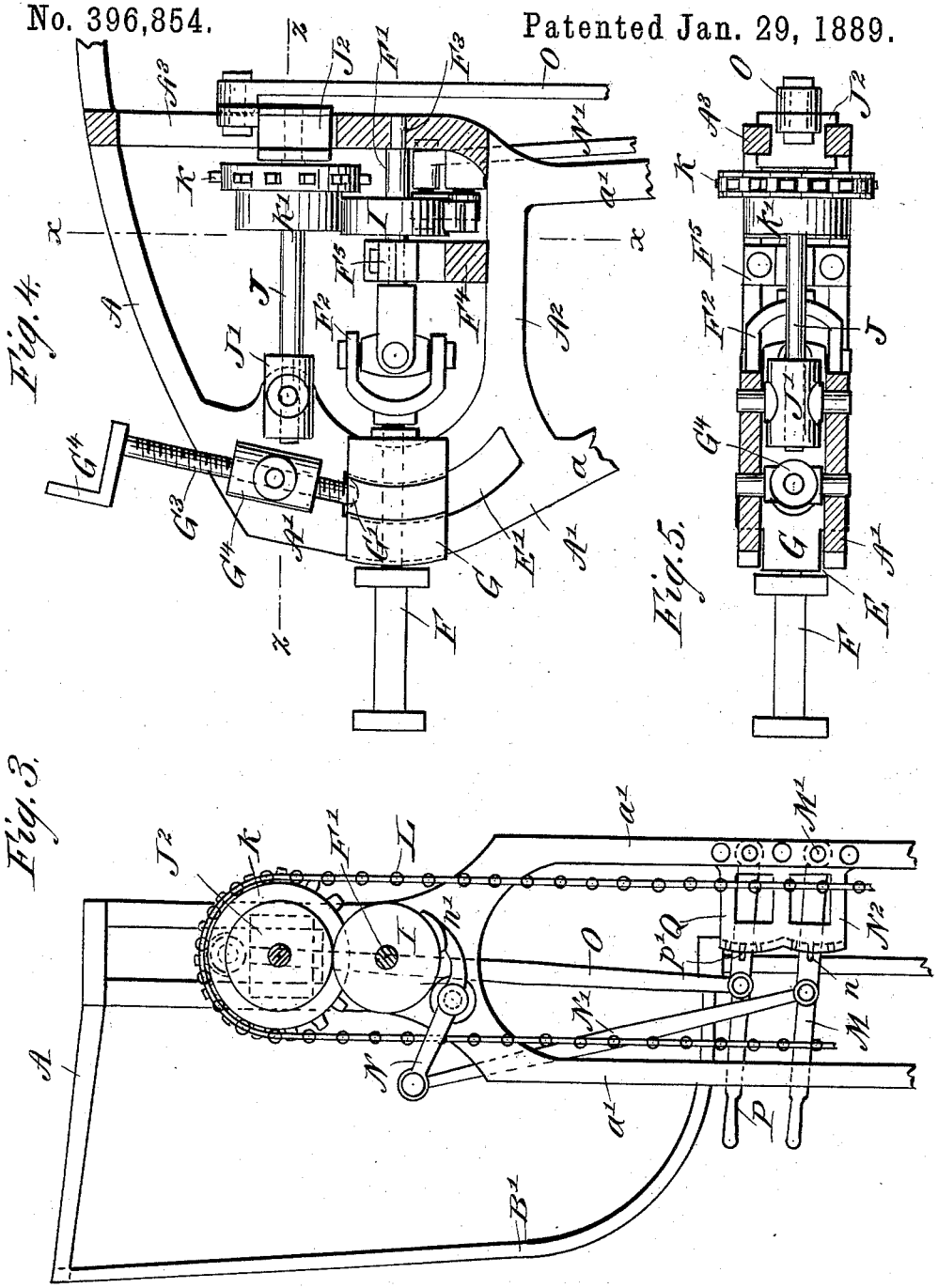

RICHARD E. BOWEN, OF NEW YORK, N. Y.

VELOCIPEDE.

SPECIFICATION forming part of Letters Patent No. 396,854, dated January 29, 1889.

Application filed September 1, 1888. Serial No. 284,339. (No model.)

*To all whom it may concern:*

Be it known that I, RICHARD E. BOWEN, of the city, county, and State of New York, have invented a new and Improved Bicycle, of which the following is a full, clear, and exact description.

The object of my invention is to provide a bicycle with means for inclining the wheels at the pleasure of the rider, so that the lower part of each wheel may be moved inward for the purpose of running on a narrow path, and to provide a bicycle with a brake, also to provide means for steering the machine; and it consists in the parts which will be hereinafter described, and pointed out in the claims.

Reference is to be had to the accompanying drawings, forming a part of this specification, in which similar letters of reference indicate corresponding parts in all the figures.

Figure 1 is a front elevation of my invention. The dotted lines in this view represent the wheels inclined. Fig. 2 is a sectional side elevation of one of the wheels and the operating and braking mechanism. Figs. 3, 4, and 5 are enlarged details, Fig. 3 being a section on the line $x\ x$ of Fig. 4, Fig. 4 a sectional front view of one side of the frame on an enlarged scale, and Fig. 5 a section on the line $z\ z$ of Fig. 4.

The frame consists of a bow-top, A, provided on each side with a loop-bracket, each bracket consisting of a curved outer piece, A', a horizontal piece, $A^2$, and vertical piece $A^3$. Extending downward from each bracket aforesaid are two converging arms, $a\ a'$, and $a^2$ is a looped continuation which unites said arms. A seat, B, is secured to and suspended by two arms, B'. A straight bar, $B^3$, is fixed at its upper end to the under side of the seat, and said bar is fixed near its lower end to the cross-piece $a^2$ aforesaid. The lower end of the bar $B^3$ is provided with a cross-piece, $b$, constituting a step. A rod, C, is bent so as to form a double reverse crank-treadle, the outer ends of which are journaled in the respective sides of the frame $a^2$, and the inner part of said rod, between the cranks, is mounted in an opening in the bar $B^3$. The ends of the rod C extend outward beyond the sides of the frame in which they are journaled, and said ends are each provided with a sprocket-wheel, D.

Each outer frame-piece, A', is formed with a vertical slot, E, and provided with an arc slot, E', intersecting the slot E, as shown in Figs. 4 and 5.

F F' are two short shafts connected by a universal joint, $F^2$. The shaft F passes through the slot E in the frame A', and is journaled in a sliding block, G, mounted in the slots E E'. The upper side of the block G is provided with a recess, G', for the reception of the lower end of a screw-threaded rod, $G^3$. An internally-screw-threaded sleeve, $G^4$, is pivotally secured to the frame-piece A' in the slot E, and the rod $G^3$ is engaged in said sleeve, said rod being provided with a handle, $G^4$. A main wheel, $G^2$, is fixed to the outer end of the shaft F. The inner end of the shaft F' is journaled in an opening, $F^3$, in the frame-piece $A^3$.

$F^4$ is a block mounted on the cross-piece $A^2$, the upper end of said block being provided with a box, $F^5$, for supporting the shaft F'. A friction-wheel, I, is fixed to the shaft F' between the block and frame-piece $A^2$ aforesaid. A short shaft, J, has one end seated in a sleeve-bearing, J', said sleeve being pivoted to the outer frame-piece, A'. The other end of the shaft J is journaled in a block or box, $J^2$, held to slide in a slot in the frame-piece $A^3$, and said shaft is provided with a sprocket-wheel, K, and a friction-wheel, K', both fixed thereto. A sprocket-chain, L, connects the sprocket-wheels D K.

A brake-lever, M, is fulcrumed at M' to the frame $a'$. N is a lever also fulcrumed to the frame $a'$. A rod, N', has its lower end jointed near the middle of the lever M, the upper end of said rod being jointed to the outer end of the lever N. The lever M is provided with a lug or projection, $n$, for engaging a segmental rack, $N^2$. A shoe, $n'$, carried by the lever N is adapted to engage the periphery of the friction-wheel I.

A rod, O, has its upper end secured to the movable block $J^2$, the lower end of said rod being jointed to a lever, P, and said lever being fulcrumed to the frame $a'$. A segmental rack, Q, is fixed to the frame $a'$, and the lever P is provided with a side lug or pin, $p'$, for engaging said rack.

The operation is as follows: By turning the crank-treadles C the sprocket-wheels D K and sprocket-chain L are actuated. The sprocket-wheel K rotates the shaft J and friction-wheel K'. Said friction-wheel in turn, by frictional contact, turns the friction-wheel I, the shafts F F', and their universal joint. The wheel G and its shaft F, being rigidly united, turn together. By screwing down the threaded rods $G^3$ the point of each rod will force down the block G, the shaft F, and its wheel $G^2$. This action will incline the wheels $G^2$, as indicated in Fig. 1, so as to cause them to tread a narrow path. The wheels may be inclined to any reasonably-desired extent at the pleasure of the rider. When the screws are raised, the wheels will return to their normal position by reason of the weight between said wheels.

The machine is steered by raising one of the friction-wheels K' out of contact with its companion wheel I. These two wheels are thrown out of contact by raising the lever P. Such action raises the rod O, and said rod slightly elevates the movable block $J^2$. Said block in turn elevates the shaft J, the sprocket-wheel K, and friction-wheel K', said friction-wheel K' being thereby raised out of contact with its companion wheel I. The block $J^2$ has a slight vertical play in the frame $A^3$ to permit of the foregoing action. When the parts are so elevated, the sleeve-bearing J' for the shaft J is slightly turned on its pivot. When the frictional wheels on one side of the machine are out of contact, that side of the machine will advance more rapidly than the other side, and thus effect the desired result in steering. The same result in steering may be practically attained by applying one of the lever-brakes N.

Having thus described my invention, what I claim as new, and desire to secure by Letters Patent, is—

1. In a bicycle, the combination, with the frame, of two shafts connected by universal joint, one of the said shafts having a main wheel fixed thereto, and mechanism, substantially as described, for inclining said wheel, substantially as shown and described.

2. In a bicycle, the combination, with a frame having an arc slot, of a movable block in said slot, two shafts connected by universal joint, one of said shafts being mounted in the block aforesaid and having a main wheel fixed thereto, and mechanism, substantially as described, for inclining the said wheel, substantially as shown and described.

3. In a bicycle, a frame having an arc slot, a movable block in said slot, and two shafts connected by universal joint, one of said shafts being mounted in the block aforesaid and having a main wheel fixed thereto, in combination with an internally-screw-threaded sleeve pivotally secured to the frame aforesaid and a screw-threaded rod in said sleeve, substantially as shown and described.

4. In a bicycle, a frame having two shafts, J F', mounted therein, each of said shafts being provided with a friction-wheel, and means, substantially as specified, for lifting one frictional wheel out of contact with the other, substantially as shown and described.

5. In a bicycle, the combination, with a frame, of two shafts, J F', one end of the shaft J being mounted in a pivotal bearing, the other end thereof being mounted in a sliding bearing, each of the shafts aforesaid being provided with a friction-wheel, and means, substantially as specified, for elevating the sliding bearing and connected parts aforesaid, substantially as shown and described.

6. In a bicycle, the combination, with a frame, of two shafts, J F', one end of the shaft J being mounted in a pivotal bearing, the other end thereof being mounted in a sliding bearing, the shaft J being also provided with a friction-wheel and a sprocket-wheel, the shaft F' being also provided with a friction-wheel, a rod for lifting the sliding bearing and connected parts, and a sprocket-chain, substantially as shown and described.

7. In a bicycle, a frame provided with two shafts, J F', each having a friction-wheel, the shaft J being mounted in a pivotal and a sliding bearing, as specified, in combination with a segmental rack, lever M, and rod O, one end of said rod being connected to the sliding bearing aforesaid, substantially as shown and described.

8. In a bicycle, a frame provided with two shafts, J F', the shaft J having a sprocket-wheel and a friction-wheel fixed thereto, the shaft F' being also provided with a friction-wheel, a treadle-crank journaled in the frame, a sprocket-wheel fixed to said crank, and a sprocket-chain connecting the two sprocket-wheels aforesaid, in combination with the levers M N, connecting-rod N', and segmental rack $N^2$, substantially as shown and described.

9. In a bicycle, a frame consisting of the top piece, A, arms B', supporting the seat, a looped or bottom part, $a^2$, and a bar, $B^3$, the upper end of said bar being fixed to the arms B', the lower part thereof being fixed to the looped part aforesaid, the extreme lower end of said bar being provided with a step, substantially as shown and described.

RICHARD E. BOWEN.

Witnesses:
FRANK A. FOUTS,
C. SEDGWICK.